United States Patent [19]

Arberman

[11] 4,193,466
[45] Mar. 18, 1980

[54] TRACTION-ENHANCING DEVICE FOR AUTOMOTIVE VEHICLE DRIVE WHEELS

[76] Inventor: Fernando Arberman, 64-11 99th St., Rego Park, N.Y. 11374

[21] Appl. No.: 10,308

[22] Filed: Feb. 8, 1979

[51] Int. Cl.² .............................................. B60B 15/00
[52] U.S. Cl. ........................................ 180/15; 301/49
[58] Field of Search ................. 301/38 R, 39 T, 40 R, 301/40 S, 43, 44 T, 45–49; 180/15; 188/6

[56] References Cited

U.S. PATENT DOCUMENTS

| | | | |
|---|---|---|---|
| 2,094,425 | 9/1937 | Cook | 301/49 |
| 3,036,649 | 5/1962 | Truitt | 301/49 |
| 3,239,277 | 3/1966 | Beck | 301/49 |

*Primary Examiner*—H. Grant Skaggs
*Attorney, Agent, or Firm*—Norbert P. Holler

[57] ABSTRACT

A traction-enhancing device for use with a drive wheel of an automotive vehicle comprises an annular disc mounted on the drive wheel axle inboard of the wheel for rotation therewith, at least one traction element rockably mounted on the inboard face of the disc and normally biased to a rest position, and an actuator mounted on the underside of the vehicle and remotely controlled from the vehicle instrument panel to enable an abutment member connected therewith to be selectively protracted into or retracted from the nadir of the path of revolving movement of a cam portion of the traction element with the disc. When the vehicle is trapped on a slippery surface, such as mud, snow or ice, and the drive wheels can only spin helplessly, the abutment member may be temporarily protracted toward the rotating annular disc, so that once during each full revolution of the wheel the cam portion of the traction element comes into engagement with and is drawn past the abutment member. This causes the element to be rocked in one sense or the other, depending on the direction of rotation of the wheel, into a working position in which a foot portion of the element engages the ground or the mud, snow or ice thereon and acts to inhibit the spinning of the wheel, so as to provide a temporary increase in traction to the wheel and also to impart a small degree of momentum to the vehicle to start the same rolling.

8 Claims, 6 Drawing Figures

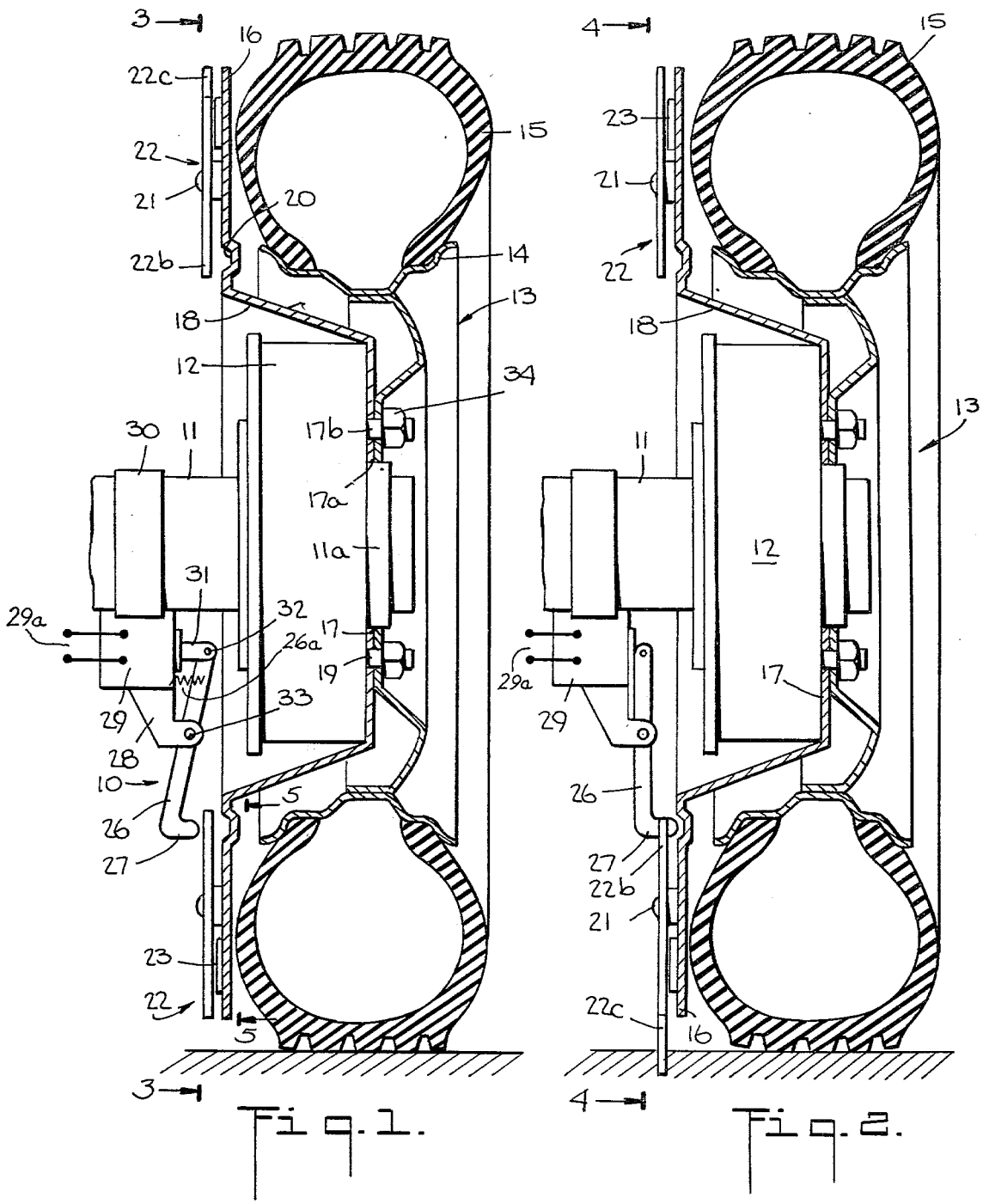

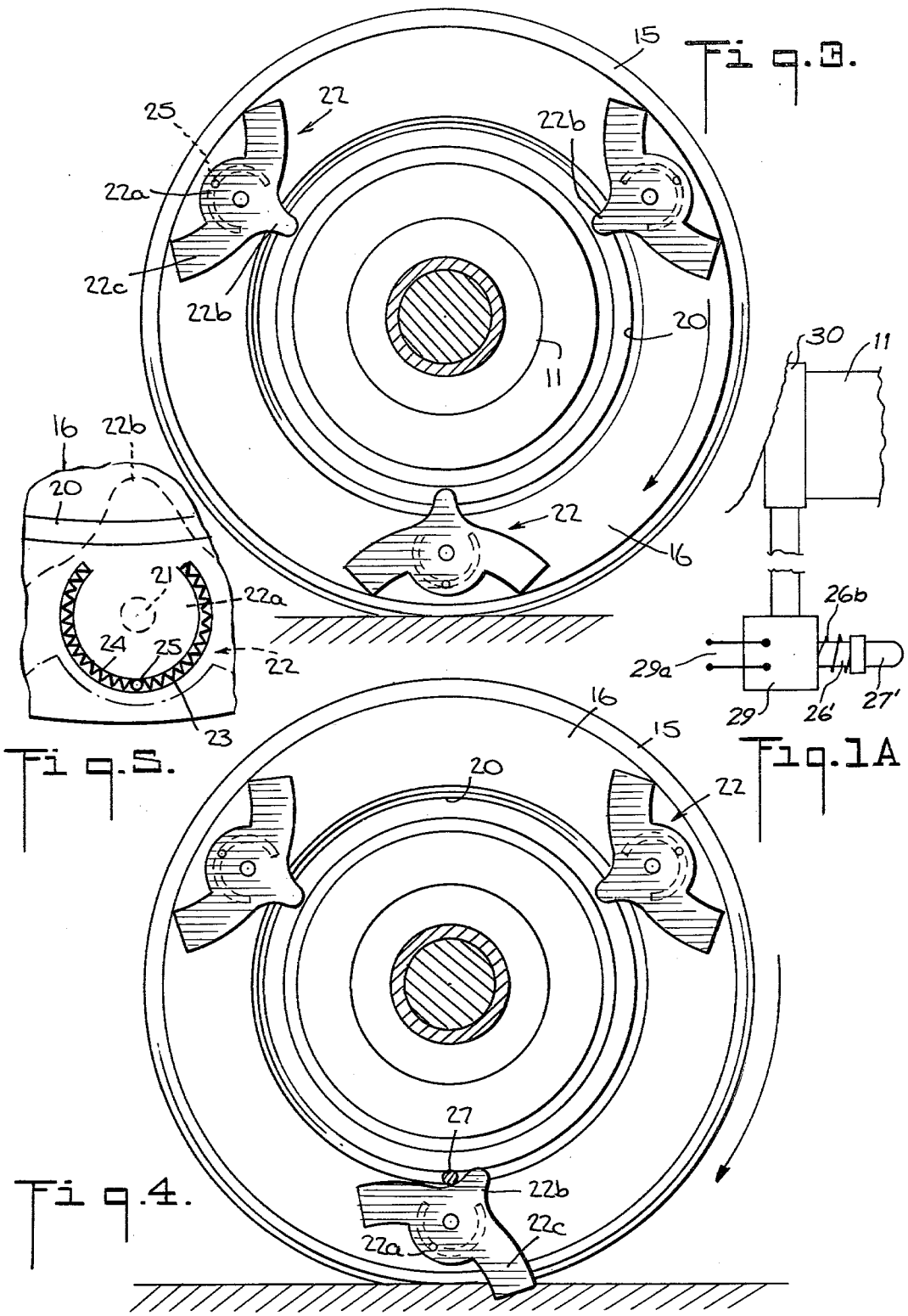

TRACTION-ENHANCING DEVICE FOR AUTOMOTIVE VEHICLE DRIVE WHEELS

This application relates to traction devices for automotive vehicles, and in particular to devices intended to provide temporary increases in traction for the drive wheels of vehicles stuck in and attempting to move either forwardly or rearwardly from snow, ice or mud.

One type of misfortune which in all probability happens sooner or later to almost every driver of an automotive vehicle is for the vehicle to become stuck in snow or mud or on an icy surface and be unable to escape therefrom because one or both of the rear wheels of the vehicle are spinning helplessly and unable to gain sufficient traction to propel the vehicle out of its location. The wear and tear to which the tires and the transmissions of such vehicles are subjected as their drivers are attempting to get out of such situations, the feelings of frustration and helplessness which engulf the driver of such a stuck vehicle, and the risk of illness and physical injury which the driver incurs when forced to get out of his vehicle under possibly highly adverse conditions of weather and/or location either for the purpose of securing help or for the purpose of digging himself out of the hole, so to speak, are so well known as to require no description.

Auxiliary traction devices adapted to be mounted on and secured to vehicle wheels and having selectively protractable and retractable ground engaging elements for the purpose of providing increased traction in various environments, including on snow, ice or mud, have been disclosed in the patent literature. Representative disclosures of such devices are found in U.S. Pat. No. 2,250,713 (Johnson), U.S. Pat. No. 2,559,721 (Kruse), U.S. Pat. No. 3,112,784 (Montenare), and U.S. Pat. No. 3,239,277 (Beck). For one reason or another, however, the only auxiliary traction-enhancing devices which seem to have found commercial acceptance are tire chains. Mud and snow tires having appropriate tread configurations with or without inserted metal studs are, of course, also well known and frequently used, but even such tires tend to lose at least some of their effectiveness on ice, and even in mud and snow if the tread grooves become tightly packed.

It is the principal object of the present invention, therefore, to provide a simple and effective mechanical auxiliary traction-enchaning device for automotive vehicles, of which device a first part carrying at least one intermittently activatable traction element can be readily mounted on a vehicle drive wheel axle immediately inboard of the wheel for joint rotation therewith, and of which device a second part for selectively rendering the traction element operative irrespective of the direction of rotation of the first part can itself be activated by the driver from the driver's seat of the vehicle through a suitable remote control.

Generally speaking, the basic objectives of the present invention are attained by a traction-enhancing device for an automotive vehicle having a drive wheel axle and a tired drive wheel mounted thereof, which device comprises (a) an annular disc having an outer diameter less than that of the tread of the tire when the same is properly fully inflated, and means for securing said annular disc to said drive wheel axle inboard of said drive wheel and for joint rotation with said drive wheel, said annular disc being provided, between and concentric with its inner and outer peripheral edges, with an annular groove formed on that face of said annular disc directed inboard of the vehicle; (b) at least one traction element rockably mounted on said annular disc at said inboardly directed face of the latter for angular movement relative to said annular disc and between a rest position and a working position, said traction element having a foot portion projecting toward said outer peripheral edge of said annular disc and a cam portion projecting toward said inner peripheral edge of said annular disc, said foot portion being dimensioned to extend beyond the groundengaging tread surface of the tire when said traction element is moved to said working position, and said cam portion being dimensioned to overlie said annular groove when said traction element is in said rest position; (c) resilient means interconnected between said annular disc and said traction element for biasing the latter toward said rest position thereof; (d) an abutment member having a tip end region dimensioned to fit smoothly slidably into said groove, and means supporting said abutment member for reciprocal movement of said tip end region thereof between protracted and retracted positions relative to said annular disc, said supporting means being mounted on the vehicle so as to dispose said tip end region of said abutment member in position to enter and be received in the nadir of said groove upon said tip end region being moved to said protracted postion thereof; and (e) operating means mounted on the vehicle for effecting said reciprocal movement of said tip end region of said abutment member; (f) the arrangement being such that said cam portion of said traction element and said abutment member, upon protraction of said tip end region of the latter into said groove and concurrent rotation of said annular disc with said drive wheel when the tread of the tire on the latter is located on a slippery surface on the ground, coact, whenever said cam portion comes into engagement with said tip end region, to move said traction element out of said rest position and to shift said foot portion thereof so as to project beyond the tire tread and engage the ground for providing a temporary increase in traction and a small degree of vehicle momentum to enable the vehicle to escape from said slippery surface.

More particularly, in the presently contemplated best mode of practicing the present invention the traction-enhancing device has two parts, one mounted on and rotatable with the drive wheel axle, and the other mounted on the vehicle chassis. Within this arrangement the first part of the device comprises an outer annular disc or plate, an inner annular disc or plate axially offset with respect to the outer one, and a generally tubular bridging portion interconnecting the two discs. The two discs and the bridging portion may be integral parts of a unitary structure formed, for example, of a single plate or sheet of metal such as steel, or they may be separate members suitably affixed, e.g. by bolts or welding, to one another. The inner disc is adapted to be secured to the vehicle drive wheel axle, and to this end it is provided with a plurality of apertures distributed about its central axle end-receiving opening to accommodate the usual wheel mounting bolts protruding from the end face of the rotatable wheel hub and brake drum housing mounted on the axle. The outer disc, at the face thereof directed away from the inner disc, is provided with an annular groove running along the inner peripheral edge of the outer disc. Between its outer peripheral edge and the groove the outer disc supports a plurality of rockably mounted traction elements each having a foot portion extending from the pivot location of that element toward the outer peripheral edge of the outer disc, and a cam portion extending from the said pivot location toward the inner peripheral edge of the outer disc. Respective resilient means are interconnected between the outer disc and each traction element so as normally to bias each element to a neutral or rest position in which the cam portion thereof is oriented to overlie the groove. The foot portion of each element is so shaped and dimensioned as to extend beyond the outer peripheral edge of the outer disc and beyond the tread of the tire on the associated wheel whenever the respective traction element is shifted, against the biasing force of the associated resilient means, to a working position.

The second part of the device includes an abutment member mounted on the underside of the vehicle for reciprocal movement of a tip end region of the member toward and away from the outer disc, the tip end region of the member being dimensioned and positioned, when protracted toward the outer disc, to enter and fit smoothly slidably into the nadir of the annular groove in the latter. Suitable mechanical or electrical means which can be operated from the driver's seat are also provided for moving the abutment member so as to enable the tip end region thereof to be either protracted into or retracted from the groove.

The arrangement thus is such that as long as the tip end region of the abutment member is retracted from the groove, when the vehicle is in motion the first part of the device simply rotates with the wheel, and the traction elements revolve about the drive wheel axle without coming into contact with the ground. If, on the other hand, the tip end region of the abutment member is protracted into the groove, then upon rotation of the wheel the cam portion of each traction element that reaches the nadir of its revolving path of movement comes into contact with the abutment member, so that upon continued rotation of the wheel and as the cam portion is dragged past the abutment member the said element is rocked in one direction or the other relative to the outer disc, depending on the direction of rotation of the wheel. This causes the foot portion of that element to be displaced angularly downwardly toward the ground and so as to either press against the ground or bite into the portion of the slippery surface adjacent that located below the tire. As a result, free spinning rotation of the wheel is repeatedly inhibited and a temporary repeated increase in traction is provided, thereby to impart to the vehicle a small degree of momentum sufficient to start the vehicle rolling and to enable it to escape from its trapped state. As soon as the cam portion of each traction element has slipped past the abutment member, of course, that element is automatically returned to its rest position by the associated resilient biasing means and remains there until it comes back again to the nadir of its travel path.

The first part of the traction-enhancing device according to the present invention may, as will be apparent, include only one traction element. Nevertheless, normally a plurality of such elements will be used, for example, three or four, preferably located at equiangularly spaced locations along the outer disc. In such an arrangement, of course, as each of the traction elements reaches the nadir of its path of travel where the tire contacts the ground, it will in its turn be activated as above described. In this manner, therefore, a series of intermittent, repeated increases in traction are provided during each full rotation of the wheel, and because of their greater frequency these will serve more efficaciously to enable the vehicle to move out of its stuck condition.

The foregoing and other objects, characteristics and advantages of the present invention will be more clearly understood from the following detailed description of a preferred embodiment thereof when read in conjunction with the accompanying drawings, in which:

FIGS. 1 and 2 are fragmentary radial sections through a vehicle wheel and axle and illustrate the traction-enhancing device according to the present invention as installed, FIG. 1 showing the device in its inactive state and FIG. 2 showing the device in its activated state;

FIG. 1A is a fragmentary view, similar in form to FIGS. 1 and 2, of a modified embodiment of the activating means for the ground-engaging elements of the traction-enhancing device according to the present invention;

FIGS. 3 and 4 are, on a somewhat reduced scale, sectional views taken, respectively, along the lines 3—3 and 4—4 in FIGS. 1 and 2; and FIG. 5 is a fragmentary elevational view taken along the line 5—5 in FIG. 1 and illustrates a preferred form of the biasing means for one of the traction elements of the device.

Referring now to the drawings in greater detail, a traction-enhancing device 10 according to the present invention is shown as mounted on an automotive vehicle the details of which other than the drive axle housing 11, the rotatable wheel hub 12 and one of the drive wheels 13 (including the wheel rim 14 and the pneumatic tire 15) have been omitted for the sake of clarity.

More particularly, the device 10 includes a first part adapted to be mounted on the wheel hub just inboard of the drive wheel and a cooperating second part mounted on the underside of the vehicle. As shown, the first part includes a first or outer annular disc or plate 16, a second or inner annular disc or plate 17, and a generally tubular bridging member 18 interconnecting the annular discs 16 and 17. The interior space of the bridging member 18 is sufficient to accommodate the wheel hub 12, and the axial offset between the discs 16 and 17 is sufficient to accommodate the inboard half or so of the wheel rim 14 and the tire 15. Around its central opening 17a, which is designed for accommodating the axle end region 11a, the disc 17 is provided with a plurality of holes 17b which are distributed about the central opening so as to accommodate the wheel mounting bolts 19. On its face directed away from the annular disc 17 and thus inboard of the vehicle, the annular disc 16 is provided with an annular groove 20 running along the inner peripheral edge of the disc and with a plurality of pivot studs or bolts 21 on which are rockably supported respective traction elements 22.

In the illustrated form of the invention, each of the traction elements 22 has a medial pivot portion 22a, a cam portion 22b and a two-armed foot portion 22c, and each traction element further has associated therewith a resilient biasing means tending to retain the element in a neutral or rest position (shown in FIG. 3). As presently contemplated, each biasing means is in the form of a resilient spring 23 which is located in a respective arcuate slot 24 concentric with the associated pivot bolt 21 and defined in the region of the annular disc 16 juxtaposed to the associated traction element 22, the opposite ends of the spring being suitably anchored to the opposite ends of the slot 24, and the medial portion of the spring being anchored to a small protuberance 25 carried by the associated traction element. The arrangement is such that in the rest position of the traction elements 22 the cam portions 22b thereof extend toward the inner peripheral edge of the annular disc 16 and sufficiently to overlie the groove 20 at least in part. Correspondingly, the foot portions 22c of the various traction elements extend toward the outer peripheral edge of the disc 16 but not sufficiently to project beyond the surface locus of the tread of a properly inflated tire 15. Preferably, they will terminate substantially even with the outer peripheral edge of the disc 16. The foot portion of each traction element must, however, be so dimensioned as to be capable of being projected beyond the locus of the tread surface when that element is displaced out of its rest position and into a working position (as shown at the bottom of FIG. 4).

The second part of the traction-enhancing device 10 includes an abutment member 26 having a tip end region 27 dimensioned to fit smoothly slidably into the annular groove 20 provided on the annular disc 16, means 28 for supporting the abutment member for reciprocal movement of the tip end region thereof toward and away from the disc 16, operating means 29 for effecting such reciprocal movements of the abutment member, and means 30 for mounting the supporting means 28 and the operating means 29 on the underside of the vehicle, e.g. on the drive axle housing 11. The operating means 29 is of a type which can be remotely controlled by means of any suitable means accessible to the driver while in the driver's seat of the vehicle, e.g. a suitable on-off switch (not shown) provided on the dashboard of the vehicle. Thus, the operating means may be electrical (e.g. a reversible electric motor or a solenoid equipped with electrical terminals schematically indicated at 29a and connected in conventional manner, not shown, to the aforesaid dashboard switch), mechanical, hydraulic or pneumatic in terms of its operation and ordinarily will include any suitable transmission means for applying its power output to the abutment member 26. In the illustrated embodiment of the invention, the operating means 29 is, by way of example, an electric motor akin to the type used for raising and lowering remote controlled antennas and includes an operating element 31 adapted to be linearly reciprocated. The element 31 is articulated at 32 to one end of the lever-like abutment member 26 and constitutes the transmission means between the motor and the abutment member, the latter being pivotally mounted intermediate its ends at 33 on the support means 28, e.g. a bracket or flange structure connected with the motor housing, and having the tip end region 27 provided at its other end. In lieu of a pivoted lever-type abutment member 26, of course, the abutment member may be simply in the form of a longitudinally movable rod 26' (see FIG. 1A) having a tip end region 27' aligned in toto with the nadir of the groove 20 and drivably connected with the motor or other operating means 29. For reasons to be more fully explained presently, the abutment member 26 (or 26') preferably is also provided with biasing means, such as a spring schematically indicated at 26a in FIG. 1 (the spring has been omitted from FIG. 2 for the sake of simplicity) and at 26b in FIG. 1A, for biasing the tip end region thereof toward the groove 20 in the disc 16.

In use, as can be seen from FIGS. 1 and 2, when a traction-enhancing device 10 according to the present invention is to be mounted on the vehicle, the nuts 34 are unscrewed from the bolts 19 in the usual manner and the wheel 13 is then removed from the wheel hub 12. The disc 17 is then slipped onto the bolts, whereupon the wheel is remounted and both units are secured in place by reaffixing the nuts 34 onto the bolts 19. Correspondingly, the abutment member 26, along with it support means 28 and the operating means 29, is mounted on the underside of the vehicle, for example by securing the same to the drive axle housing 11, care being taken to ensure that the tip end region of the abutment member, whether the latter is a pivoted lever structure 26 or a longitudinally slideable rod structure 26', is properly aligned with the nadir of the groove 20 in the outer annular disc 16 of the first part of the device and that the operating means 29 is properly connected to the activating element accessible to the driver of the vehicle. In this regard it might be pointed out that although superficially it would appear advisable to provide two such traction-enhancing devices, one at each end of the drive axle of the vehicle for cooperation with the respective drive wheels, this is not believed necessary and a proper operation of the device in its intended manner will be attained even though only one such device is used at one end of the axle. Under ordinary driving conditions, the device is not activated, of course, and though the disc 16 rotates with the wheel 13 this has no effect on the operation of the vehicle since the abutment member 26 and the traction elements 22 all remain in their positions shown in FIGS. 1 and 3.

In the event the vehicle becomes stuck on a slippery surface, e.g. in snow or mud, or on ice or gravel or sand, and the vehicle is unable to escape therefrom because the drive wheels merely spin helplessly as gas is fed to the engine, the driver activates the operating means 29 and thereby the abutment member 26 or 26' so as to protract the tip end region 27 or 27' of the abutment member toward the annular disc 16 and (assuming none of the traction elements is in the way) into the groove 20. The driver then again, and for obvious reasons as gently as possible, depresses the accelerator pedal and the wheel 13 starts to rotate. Sooner or later, therfore, one of the traction elements 22 approaches the nadir of its path of revolving movement around the drive axle, and ultimately one side of the cam portion 22b of that element comes up against the tip end region 27 or 27' of the abutment member. As the wheel then continues to rotate, the traction element is rocked out of its rest position and into its working position, as shown at the bottom of FIGS. 2 and 4. This causes the foot portion 22c to be shifted so as to project beyond the surface locus of the tread of the tire 15 so as to be pressed against the ground and, possibly, so as to bite into the snow, mud or ice in which the tire is stuck. As a result, the spinning of the wheel is inhibited somewhat (and if the ground is sufficiently hard the tire may even be lifted slightly off the ground and the vehicle jogged or "jumped" somewhat), until the cam portion 22b has passed the abutment member 26 and the traction element is returned to its rest position by the biasing means 23. The sum total of these actions is to impart to the vehicle a small degree of momentum in the appropriate direction, i.e. forward or backward, which in turn tends to impart a rolling motion to the vehicle to enable it to escape from the slippery surface. Should the operation of the first traction element to reach the abutment member prove to be insufficient, of course, shortly thereafter, as the wheel continues to rotate, the next traction element reaches the abutment member and the same operation as described above takes place, and so forth, ultimately being repeated during each revolution of the wheel as many times as there are traction elements 22 distributed along the annular disc 16.

As soon as the vehicle is freed, of course, the driver activates the operating means 29 in the reverse direction to retract the tip end region of the abutment member from the groove 20, whereupon the device 10 again remains inactive and operation of the vehicle can proceed in the normal way.

Reverting for the moment to the initial activation of the operating means, it will be apparent that the tip end region of the abutment member may first engage one of the traction elements and thus be prevented from entering the groove 20 if that element is just then located at the nadir of its path of movement. This will pose no problem as long as the operating means is arranged to continue to press the tip end region of the abutment member forward until and after the traction element has moved out of the way, even if the driver has in the meantime released the activating element for the operating means. If the operating means does not do so, however, a malfunction would result, i.e. the device would not be properly activated. It is for this reason that the abutment member preferably is associated with a spring or like biasing means 26a or 26b to urge the tip end region 27 or 27' continuously toward the groove, so that even if the activating element for the operating means 29 were to be released, the tip end region would nevertheless continue to move and be protracted into the groove as soon as the originally impeding traction element was moved away by the rotation of the wheel.

As a further possible refinement of the present invention, the operating means 29 may be interlocked in any suitable way, for example by a means of a control over the fuel feed into the vehicle engine, with the power system for the drive wheel axle so as to ensure that once the abutment member has been activated the rotational speed of the drive wheel cannot exceed a preset maximum level regardless of how heavily the driver presses on the accelerator pedal. The same type of interlock or control can, of course, serve also to ensure the corollary, namely that the abutment member cannot be activated unless or until the wheel has ceased or almost ceased to rotate. In this way, a possibly damaging high speed engagement between the cam portion of a traction element and the tip end region of the abutment can be avoided.

With respect to the first part of the device 10, it is contemplated that the disc structure 16-17-18 and the traction elements 22 should preferably be made of high strength steel or the like so as to be able to withstand the forces to which they will be subjected in use. The high structural strength of the discs will, however, also provide another advantage, namely that in the event the tire 15 becomes deflated while the vehicle is in motion, the outer disc 16 may provide just enough interim support for the vehicle to enable the driver to keep the vehicle from going catastrophically out of control. It is because of this possibility that it is preferred, as previously stated, that the foot portions of the traction elements in their respective rest positions should not project beyond the outer peripheral edge of the outer disc 16. The ground-engaging extremities of the traction elements, of course, require not only strength but wear-resistance as well, and thus the traction elements (which may have continuous single-edge extremities rather than the two-armed arrangement shown) may be provided with replaceable edge or tip structures of a material similar to that of which tire studs are normally made.

It will be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. A traction-enhancing device for an automotive vehicle having a drive wheel axle and a tired drive wheel mounted thereon, said device comprising:

an annular disc having an outer diameter less than that of the tread of the tire when the same is properly fully inflated, and means for mounting said annular disc on said drive wheel axle inboard of said drive wheel and for joint rotation with said drive wheel, said annular disc being provided, between and concentric with its inner and outer peripheral edges, with an annular groove formed on that face of said annular disc to be directed inboard of the vehicle when said annular disc is mounted on said drive wheel axle;

at least one traction element rockably mounted on said annular disc at said face of the latter for angular movement relative to said annular disc and between a rest position and a working position, said traction element having a foot portion projecting toward said outer peripheral edge of said annular disc and a cam portion projecting toward said inner peripheral edge of said annular disc, said foot portion being dimensioned to extend beyond the ground-engaging tread surface of a fully inflated tire associated with said annular disc when said traction element is moved to said working position, and said cam portion being dimensioned to overlie said annular groove when said traction element is in said rest position;

resilient means interconnected between said annular disc and said traction element for biasing the latter toward said rest position thereof;

an abutment member having a tip end region dimensioned to fit smoothly slidably into said groove, and means for supporting said abutment member for reciprocal movement of said tip end region thereof between protracted and retracted positions relative to said annular disc, said supporting means being adapted, when mounted on the vehicle, to dispose said tip end region of said abutment member in position to enter and be received in the nadir of said groove upon said tip end region being moved to said protracted position thereof; and operating means for effecting said reciprocal movement of said tip end region of said abutment member;

said cam portion of said traction element and said abutment member, upon protraction of said tip end region of the latter into said groove and concurrent rotation of said annular disc with a vehicle drive wheel when the tread of the tire on the latter is located on a slippery surface on the ground, coacting whenever said cam portion comes into engagement with said tip end region, to move said traction element out of said rest position and to shift said foot portion thereof so as to project beyond the tire tread and engage the ground for providing a temporary increase in traction and a small degree of vehicle momentum to enable the vehicle to escape from said slippery surface.

2. A traction-enhancing device according to claim 1, wherein a plurality of traction elements are rockably mounted on said annular disc at substantially equiangular spacings along the circumference thereof.

3. A traction-enhancing device for use with a drive wheel of an automotive vehicle, comprising:

a first part adapted to be mounted on the rotatable wheel-mounting hub of a vehicle drive wheel axle and including normally inactive traction-enhancing means, and a second part adapted to be mounted on the underside of the vehicle and including means for selectively activating said traction-enhancing means;

said first part including a first annular disc having an outer diameter less than of the tread of a properly fully inflated tire when such tire is mounted on said hub, a second annular disc coaxial with said first annular disc, and a generally tubular bridging member interconnecting said first and second annular discs so as to dispose the same in axially offset relation to one another, the interior space of said tubular bridging member being sufficiently large to accommodate said hub therewithin, and the axial offset between said first and second annular discs being sufficient to accommodate a portion of the lateral width of such tire, said second annular disc having a central opening to accommodate the end region of said vehicle drive wheel axial and a plurality of apertures distributed about said central opening to accommodate the wheel-mounting bolts of said hub, and said first annular disc being provided, between and concentric with its inner and outer peripheral edges, with an annular groove formed on that face of said first annular disc directed away from said second annular disc;

said traction-enhancing means including at least one traction element rockably mounted on said first annular disc at said face of the latter for angular movement relative to said first annular disc and between a rest position and a working position, said traction element having a foot portion projecting toward said outer peripheral edge of said first annular disc and a cam portion projecting toward said inner peripheral edge of said first annular disc, said foot portion being dimensioned to extend beyond the ground-engaging tread surface of such tire when said traction element is moved to said working position, said cam portion being dimensioned to overlie said annular groove when said traction element is in said rest position, and resilient means interconnected between said first annular disc and said traction element for biasing the latter to said rest position thereof;

said second part including an abutment member having a tip end region dimensioned to fit smoothly slidably into said groove, means supporting said abutment member for reciprocal movement of said tip end region thereof between a protracted position and a retracted position, said supporting means being adapted to be mounted on said vehicle so as to dispose said tip end region of said abutment member in position to enter and be received in the nadir of said groove upon said tip end region being moved to said protracted position thereof when said first part is mounted on said hub and said second part is mounted on said vehicle, and operating means adapted to be mounted on said vehicle for effecting said reciprocal movement of said abutment member;

said cam portion of said traction element and said abutment member, upon protraction of said tip end region of the latter into said groove and concurrent rotation of said first part with a vehicle drive wheel having its tread located on a slippery surface on the ground, coacting, whenever said cam portion comes into engagement with said tip end region, to move said traction element out of said rest position and to shift said foot portion thereof so as to project beyond the tire tread and engage the ground for providing a temporary increase in traction and a small degree of vehicle momentum to enable the vehicle to escape from said slippery surface.

4. A traction-enhancing device according to claim 3, wherein said traction-enhancing means comprises a plurality of said traction elements rockably mounted on said first annular disc at equiangular spacings along the circumference thereof.

5. A traction-enhancing device according to claim 1 or 3, wherein said operating means comprises a reversible electric motor equipped with means enabling the motor to be energized under remote control by the driver of the vehicle, and transmission means drivingly connecting said motor to said abutment member.

6. A traction-enhancing device according to claim 1 or 3, wherein said operating means comprises spring means operatively connected with said abutment member for biasing said tip end region thereof toward said groove.

7. A traction-enhancing device according to claim 1 or 3, wherein said abutment member is a lever pivotally connected intermediate its ends to said supporting means, said operating means includes a reversibly drivable member operatively connected with one end of said lever, and said tip end region of said abutment member is located at the other end of said lever.

8. A traction-enhancing device according to claim 1 or 3, wherein said abutment member is a rod linearly movably carried by said supporting means, said tip end region of said abutment member is located at one end of said rod, and said operating means includes a reversibly drivable member operatively connected with said rod at a location spaced from said one end thereof.

* * * * *

UNITED STATES PATENT AND TRADEMARK OFFICE
CERTIFICATE OF CORRECTION

PATENT NO. : 4,193,466
DATED : March 18, 1980
INVENTOR(S) : Fernando Arberman

It is certified that error appears in the above-identified patent and that said Letters Patent are hereby corrected as shown below:

Column 1, line 61, for "thereof" read --thereon--. Column 2, line 27, for "postion" read --position--. Column 6, line 7, for "it" read --its--. Column 6, line 42, for "therfore" read --therefore--. Column 8, line 65, for "coating" read --coacting--. Column 9, line 33, for "axial" read --axle--.

Signed and Sealed this

Seventeenth Day of June 1980

[SEAL]

*Attest:*

SIDNEY A. DIAMOND

*Attesting Officer*   *Commissioner of Patents and Trademarks*